United States Patent [19]

Zalesak

[11] Patent Number: 5,090,986
[45] Date of Patent: Feb. 25, 1992

[54] METHOD FOR BENDING GLASS SHEETS

[75] Inventor: Thomas J. Zalesak, Rossford, Ohio

[73] Assignee: Glasstech, Inc., Perrysburg, Ohio

[21] Appl. No.: 675,494

[22] Filed: Mar. 26, 1991

[51] Int. Cl.$^5$ ............................................. C03B 23/03
[52] U.S. Cl. ........................................ 65/104; 65/106; 65/107
[58] Field of Search ............................ 65/106, 107, 104

[56] References Cited

U.S. PATENT DOCUMENTS 4,822,398 4/1989 McMaster et al. ................... 65/104

*Primary Examiner*—Joye L. Woodard
*Attorney, Agent, or Firm*—Brooks & Kushman

[57] ABSTRACT

A method for bending glass sheets is disclosed in which a heated glass sheet (12) is introduced between spaced lower and upper bending platens (16,18). The glass sheet (12) is moved in one direction between the spaced lower and upper bending platens (16,18) during deformation of the platens (16,18) which forms the bent shape in the glass sheet (12). Movement of the glass sheet (12) in the said one direction is continued for at least ½ second during a subsequent cooling phase to initiate a freeze in the surfaces of the glass sheet (12) which thereby eliminates mechanical distortion in the formed glass sheet associated with interrupting the movement of the glass sheet (12) prior to cooling.

7 Claims, 2 Drawing Sheets

METHOD FOR BENDING GLASS SHEETS

TECHNICAL FIELD

This invention relates to a method for bending a glass sheet and more specifically to a method of bending and initiating a freeze in the surfaces of the glass sheet while continuously moving the glass sheet in one direction.

BACKGROUND ART

In related U.S. Pat. Nos. 4,822,398; 4,883,527; 4,909,819; and 4,957,531, a method and apparatus for bending and quenching a heated glass sheet is disclosed. Therein, a pair of spaced opposed platens is provided for controlled bending of the heated glass sheet and its subsequent quenching to impart a specific shape and desirable mechanical characteristics in the bent glass sheet As these apparatus are operated, drive wheels engage the heated glass sheet and provide oscillated movement of the glass sheet during platen deformation that provides the bending. This movement of the glass sheet back and forth during the bending has resulted in a mechanical distortion, commonly referred to as roller-wave, being established in the subsequently tempered, bent glass sheet. This mechanical distortion decreases the optical quality of the bent glass sheet and such distortion becomes especially noticeable with the bending and tempering of large architectural glass sheet pieces.

SUMMARY OF THE INVENTION

An object of the present invention is to provide a method for bending glass sheets between upper and lower bending platens that decreases mechanical distortion of the resultant glass sheet to thereby improve the optical properties of the bent glass sheet.

Another object of the invention is to provide a method for bending a heated glass sheet between upper and lower bending platens having drive wheels that engage and convey the glass sheet during the bending that eliminates waviness in the surfaces of the bent glass sheet after tempering.

In carrying out the above objects and other objects of the invention, a method for bending glass sheets comprises moving a heated glass sheet in one direction between spaced upper and lower bending platens of a glass sheet bending and tempering apparatus. Such apparatus is disclosed in detail in U.S. Pat. Nos. 4,822,398; 4,883,527; 4,909,819; and 4,957,531, each of which is hereby incorporated by reference. Movement of the glass sheet between the platens is provided by drive wheels or driving discs supported by the lower platen. The glass sheet velocity is maintained in one direction prior to and during bending, and just after cooling is initiated.

The upper and lower platens are deformed during the continual movement of the glass sheet in one direction to form the specified bent shape in the glass sheet. The glass sheet is subsequently cooled for at least ½ second during the same continuous movement of the glass sheet in the said one direction before the said one direction of movement is interrupted. Cooling gas is applied in close proximity to the bent glass sheet to freeze the surface of the glass sheet. The glass sheet can thereafter be tempered while the glass sheet movement is interrupted, tempered, reversed or oscillated. This method eliminates the mechanical distortion commonly referred to as roller-wave from forming in the bent glass sheet.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
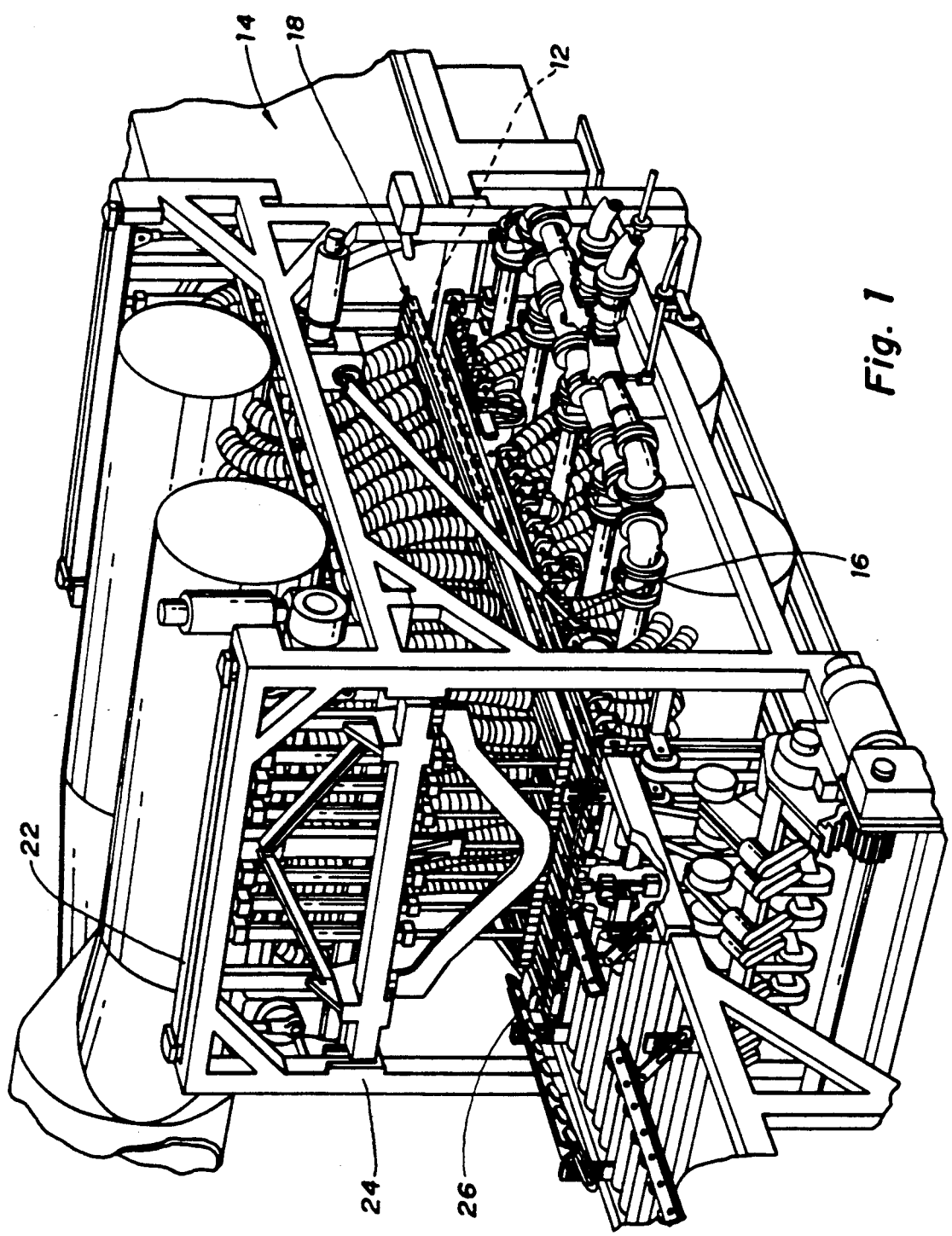
FIG. 1 is a perspective view of a glass bending and tempering apparatus suitable for performing bending and quenching of heated glass sheets in accordance with the present invention and illustrating opposed lower and upper platens, in a spaced relationship, respectively mounted thereon lower and upper frame members, thereby the apparatus being accessible for receiving a heated glass sheet between the platens.

Referring to FIG. 1, a method for bending glass sheets in accordance with the present invention is described herein with the aid of drawing illustrations that show the sequential bending steps. As is hereinafter more fully described, the method for bending is performed on a glass sheet bending and tempering apparatus such as that disclosed in U.S. Pat. Nos. 4,822,398 or 4,883,527 or on heating, bending and tempering apparatus such as described in U.S. Pat. No. 4,909,819 or 4,957,531, each of which is hereby incorporated by reference. Such a method eliminates mechanical distortion occasioned in forming large glass sheets with such apparatus. The elimination of such mechanical distortion, commonly referred to as roller-wave, increases the optical quality of the bent glass sheet.

As shown in FIG. 1, a heated glass sheet 12, heated in a glass sheet heating furnace 14, is introduced between lower and upper bending platens 16, 18 for subsequent bending. As illustrated, the lower bending platen 16 is in a planar configuration and thereby accessible. The upper bending platen 18 is retained in a planar position above the lower platen 16 prior to the glass sheet 12 being introduced between the platens. Also, an upper frame member 22, which is vertically movable in relation to a lower frame member 24, which mounts the lower platen 16, is in a spaced apart relationship with the lower frame member to further facilitate indexing of the heated glass sheet 12 from the furnace into between the platens 16, 18.

Figure 2:
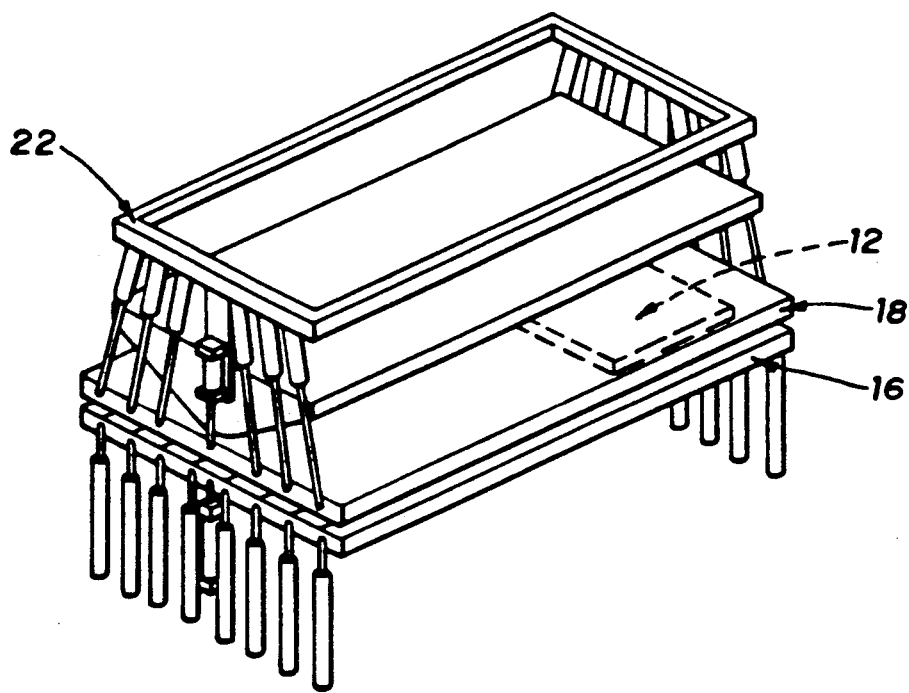
FIG. 2 is a representative perspective view of the apparatus illustrating the lower and upper platen with the glass sheet therebetween prior to bending.

As illustrated by FIG. 2, the upper frame member 22 is vertically displaced toward lower frame member 24 and the upper platen 18 is brought into contact with the lower platen 16 when the heated glass sheet 12 is indexed therebetween to initiate the bending. Throughout the bending, the heated glass sheet 12 is continuously moved in one direction, from the furnace 14 onto lower platen 16, between the lower and upper platens 16, 18. Drive wheels 26, mounted on the lower platen 16, illustrated in FIG. 1, engage the glass sheet 12 and are reversibly driven to move the glass sheet in the said one direction.

Figure 3:
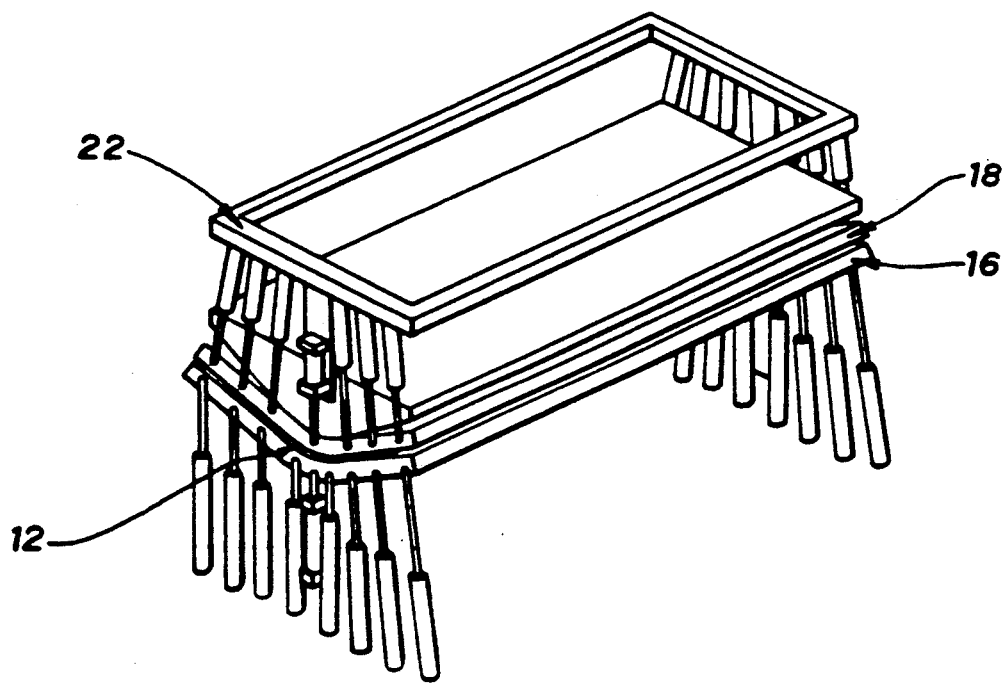
FIG. 3 is a perspective view of the apparatus illustrating deformed lower and upper platens bending the heated glass sheet.

With reference to FIG. 3 of the drawings, the lower platen 16 is controllably deformed to form the desired bent shape in the glass sheet 12. During the deformation of the platens 16, 18, the glass sheet 12 is continuously moved in said one direction. The faster the movement of the glass sheet 12, the faster the bending has to occur for a given size glass sheet in a given length of bending platens 16, 18. The upper limit of glass sheet movement is thereby a function of the mechanical parameters of the bending apparatus.

When the glass sheet 12 is bent sufficiently so that it conforms to the desired bent shape and while the glass sheet is still moving in said one direction, the bent glass sheet is cooled for at least ½ second during the movement, by applying cooling gas, to initiate a freeze in the surfaces of the bent glass sheet. Initiating such a freeze before movement of the glass sheet 12 in the said one direction is interrupted, eliminates the mechanical distortion referred to as roller-wave from forming in the bent glass sheet. After the ½ second of cooling, movement of the glass sheet 12 can be interrupted without affecting the surface of the glass sheet and its optical properties. The glass sheet 12 can thereafter be oscillated by alternately reversing the direction of rotation of the drive wheels 26 of the lower platen 16 for completing quenching of the glass sheet.

In a preferred arrangement of the apparatus, the bending rate is 5 seconds and a minimum velocity of movement of the glass sheet 12 in said one direction is 100 mm/sec.

While the best mode for carrying out the invention has been described in detail, those familiar with the art to which this invention relates will recognize various alternative designs and embodiments for practicing the invention as defined by the following claims.

What is claimed is:

1. A method for bending glass sheets comprising:
   moving a heated glass sheet in one direction between spaced upper and lower bending platens of a glass bending and tempering apparatus; deforming the platens during the movement of the glass sheet to form the desired bent shape in the glass sheet; and cooling the bent glass sheet for at least ½ second during the movement of the glass sheet by applying cooling gas to initiate a freeze in the surfaces of the bent glass sheet between the platens before the one direction of movement is interrupted thereby to prevent mechanical distortion referred to as roller wave from being formed in the bent glass sheet.

2. The method as in claim 1 wherein moving is accomplished by rotating wheels of the lower platen.

3. The method as in claim 1 wherein deforming is accomplished by operating actuators of the lower platen.

4. The method as in claim 1 wherein quenching is accomplished by actuating a source of quench air.

5. The method as in claim 1 further including controlling the velocity of the moving glass sheet.

6. The method as in claim 5 further including controlling the direction of movement of the glass sheet.

7. The method as in claim 5 wherein the apparatus has a bending rate of 5 seconds and the glass sheet is moved in said one direction at a velocity of at least 100 mm/sec.

* * * * *